(12) United States Patent
Briscoe et al.

(10) Patent No.: US 7,375,801 B1
(45) Date of Patent: May 20, 2008

(54) VIDEO SENSOR WITH RANGE MEASUREMENT CAPABILITY

(75) Inventors: Jeri M. Briscoe, Arab, AL (US); Eric L. Corder, Huntsville, AL (US); Richard T. Howard, Huntsville, AL (US); David J. Broderick, Tolland, CT (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 207 days.

(21) Appl. No.: 11/108,140

(22) Filed: Apr. 13, 2005

(51) Int. Cl.
*G01C 3/00* (2006.01)
(52) U.S. Cl. .................... 356/3.1; 356/3.11; 382/106
(58) Field of Classification Search ............... 356/4.03
See application file for complete search history.

(56) References Cited

U.S. PATENT DOCUMENTS

| | | |
|---|---|---|
| 3,530,468 A | 9/1970 | Hannan |
| 3,796,492 A | 3/1974 | Cullen et al. |
| 3,895,870 A | 7/1975 | Cullen et al. |
| 4,009,960 A | 3/1977 | Feldman et al. |
| 4,119,379 A | 10/1978 | Zindler |
| 4,567,347 A * | 1/1986 | Ito et al. .................. 219/124.34 |
| 4,701,047 A | 10/1987 | Eibert et al. |
| 4,760,269 A | 7/1988 | McKenna |
| 4,948,258 A * | 8/1990 | Caimi ........................ 356/603 |
| 4,957,369 A | 9/1990 | Antonsson |
| 4,979,815 A | 12/1990 | Tsikos |
| 4,994,681 A | 2/1991 | Mann |
| 5,218,427 A | 6/1993 | Koch |
| 5,790,241 A | 8/1998 | Trussell, Jr. |
| 5,973,788 A | 10/1999 | Pettersen et al. |
| 6,166,809 A | 12/2000 | Petterson et al. |
| 6,331,887 B1 | 12/2001 | Shiraishi et al. |
| 6,483,536 B2 * | 11/2002 | Aoyama ...................... 348/139 |
| 2003/0193658 A1 * | 10/2003 | Uomori et al. .............. 356/3.1 |

OTHER PUBLICATIONS

Carter, J. Stein Mapping—Use of Compass and Transit □□http://www.biology.clc.uc.edu/courses/bio303/use%20of%20transit.htm.*
Briscoe, J. M. et al., "Machine Vision Applied to Navigation of Confined Spaces," SPIE Defense and Security Symposium 2004, The International Society for Optical Engineering (Orlando, FL), (Apr. 14, 2004).
Davis, J.; Chen, X, "A Laser Range Scanner Designed for Minimum Calibration Complexity," Third International Conf on 3D Digitial Imaging and Modeling, 3DIM 2001, 2001 IEEE.
Nguyen, H.; Blackburn, M., "A Simple Methhod for Range Finding via Laser Triangulation," Technical Document 2734, Naval Command Control and Ocean Surveillance Center (San Diego, CA), (Jan. 2, 1995).

* cited by examiner

*Primary Examiner*—Thomas H. Tarcza
*Assistant Examiner*—Timothy A Brainard
(74) *Attorney, Agent, or Firm*—James J. McGroary; Ross F. Hunt, Jr.

(57) ABSTRACT

A video sensor device is provided which incorporates a rangefinder function. The device includes a single video camera and a fixed laser spaced a predetermined distance from the camera for, when activated, producing a laser beam. A diffractive optic element divides the beam so that multiple light spots are produced on a target object. A processor calculates the range to the object based on the known spacing and angles determined from the light spots on the video images produced by the camera.

2 Claims, 1 Drawing Sheet

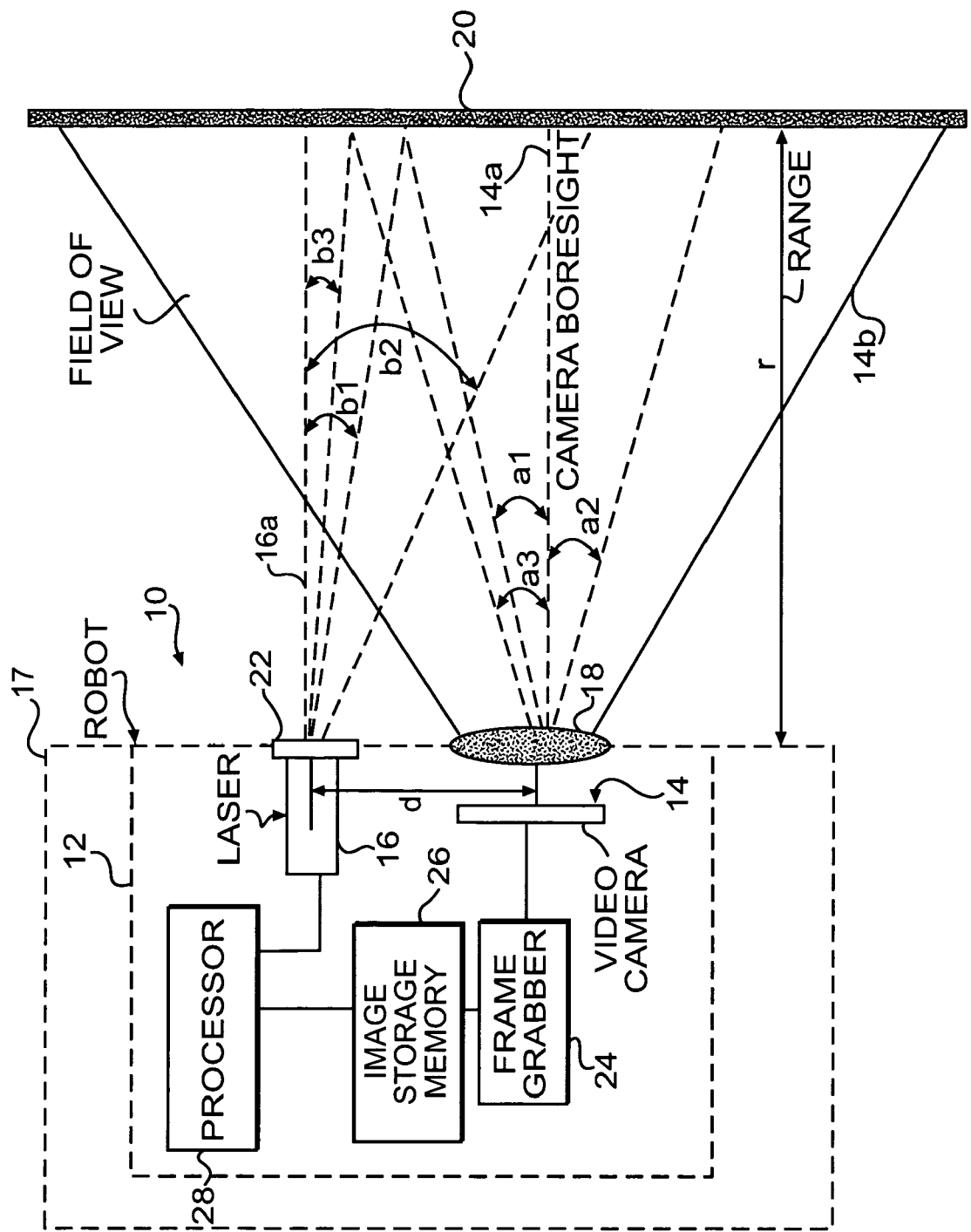

VIDEO SENSOR WITH RANGE MEASUREMENT CAPABILITY

ORIGIN OF THE INVENTION

The invention described herein was made in part by employees of the United States Government and may be manufactured and used by or for the Government of the United States of America for governmental purposes without the payment of any royalties thereon or therefor.

FIELD OF THE INVENTION

The invention relates to video sensors and inspection devices and, more particularly, to an improved video sensor having the capability of measuring the range to an object being imaged by the video sensor.

BACKGROUND OF THE INVENTION

Although the invention is not limited to such an application, an important use of the invention is in the inspection of hardware on space vehicles. There has been a further increased emphasis on the reliability of space related assets after the second loss of a space shuttle. The intricate nature of the hardware being inspected often requires that the hardware be completely disassembled in order for a thorough inspection to be performed. For this reason and others, such an inspection can be difficult as well as costly. In fact, requalification of the hardware is sometimes prohibitively expensive and time consuming. Further, it is imperative that the hardware under inspection not be altered in any way other than that which is intended.

Potential inspection areas in spacecraft include areas around turbine fans in the high pressure turbo pump, the "injection forest" where propellant and oxidizer enter the combustion chamber, and plumbing such as a cooling manifold around the nozzle. The physical environment to be navigated by the inspection device is generally characterized by constant lighting conditions, curved walls, confined spaces and two to twelve inch length corridors.

Machine vision offers an inspection approach which can enable inspection to be carried out at a faster rate using less obtrusive methods. One class of machine vision that is of particular relevance here is rangefinders and, in this regard, as will appear, the present invention is, broadly speaking, a special form of rangefinder combined with a video sensor. Commercial rangefinders are widely used and relatively accurate. Unfortunately, most are designed for outdoor use as opposed to indoor use in confined spaces, and even those specifically designed for indoor use employ time of flight (TOF) techniques that are not effective in providing accurate measurements of distances less than two feet.

Rangefinders using triangulation dominate simplified distance navigation devices. One device of interest here is described in C. Mertz, J. Kozar, J. R. Miller, C. Thorpe, C. *Eye-safe Laser Line Striper for Outside Use*, IV 2002, IEEE Intelligent Vehicle Symposium, June, 2002, December, 2001. The described device employs a laser line projected onto the target, and uses deformation in the laser line to identify and alert an automobile driver as to the proximity of the automobile to an object (e.g., a curb).

Alternative distance measuring techniques using a single camera also include pixel dithering techniques (see, e.g., Robert A Ulichney, *One-dimensional Dithering*, Proc. SPIE Vol. 3409, p. 204-214, Electronic Imaging: Processing, Printing, and Publishing in Color, Jan Bares; Ed) and an optoelectronic technique for target recognition (see, e.g., Curtis Padgett, Wai-Chi Fang, Steven Suddarth, *Smart Optoelectronic Sensor System for Recognizing Targets*, Suraphol Udomkesmalee, NASA Tech Brief, Electronic Systems category, NPO-20357).

Unfortunately, simple triangulation cannot account for curved surfaces, angles or corners, and, as set forth previously, it is important in the applications here that the inspection be carried out in environments having these features. Further, a method such as the method described in the Mertz et al. reference mentioned above, which uses a laser line, is also impractical for these applications because of the impact of increased computational requirements on size. Also, in a practical implementation, some of the various parameters (e.g., the distance from the camera to the target and the laser and camera angles) are very difficult to precisely define.

SUMMARY OF THE INVENTION

In accordance with one aspect of the invention, there is provided a video sensor device which is particularly adapted for use with a miniature inspection robot and which also has, and provides the robot with, the capability of measuring the range of the objects in the field of view of the video sensor device, such as walls or obstacles in the path of the robot.

The sensor in accordance with this aspect of the invention is small, uses low power and provides adequate accuracy at close range. Thus, the single sensor device can be used for dual purposes, viz., video imaging and range finding. Moreover, the device can be used to measure range to a spot on a target in the field of view of the camera, while enabling viewing of the video of the target at the same time.

As will appear, in accordance with a preferred embodiment of the invention, multiple spots are used and the ranges to the various spots in the field-of-view of the camera can be determined simultaneously. Another advantage of this embodiment is that no moving parts are required in making measurements relative to many points within the field-of-view, so that the resultant device is robust.

In accordance with one aspect of the invention, there is provided a video sensor device comprising:

a housing;

a single video camera and an associated lens, supported by the housing and having a field of view, for providing images of a target; and a fixed laser, supported by the housing a predetermined distance from said single video camera, for, when activated, producing a laser beam, said device further including a diffractive optic element, supported in front of the fixed laser, for converting the laser beam produced by said laser into a plurality of laser spots on the target being imaged by said camera so that the images of the target produced by the camera within the field of view of the camera include laser spots, and a processor connected to the camera for determining the distance between the camera and the target based on (i) at least one image including laser spots produced by the camera and (ii) said predetermined distance.

Both the fixed laser and the single camera have a boresight, and the distance between the camera and the target is preferably determined using the formula:

$$\frac{d}{\tan(a_i) - \tan(b_i)}$$

wherein d is the predetermined distance measured in the vertical direction between the laser boresight and the camera boresight, $a_i$ is the angle between the camera boresight and a predetermined laser spot in the vertical direction, and $b_i$ is the angle between the laser beam directed to the predetermined laser spot and the laser boresight in the vertical direction.

In one important implementation, the device further includes a frame grabber connected to or forming part of said single camera and an image storage memory connected to the frame grabber and to the processor for storing image frames for retrieval by the processor.

In accordance with a further aspect of the invention, there is provided a robotic inspection device for inspecting space vehicle hardware, said robotic inspection device comprising a mobile robot including a video sensor device comprising:

a single video camera and an associated lens, supported by the robot and having a field of view, for providing images of a hardware target;

a fixed laser, supported by the robot a predetermined distance from said single video camera, for, when activated, producing a laser beam;

a diffractive optic element, supported in front of the fixed laser, for converting the laser beam produced by said laser into a plurality of laser spots on the target being imaged by said camera so that the images of the target produced by the camera within the field of view of the camera include laser spots; and a processor, supported by the robot and connected to the camera, for determining the distance between the camera and the target based on at least one image including laser spots produced by the camera and said predetermined distance.

Preferably, the processor determines the distance between the camera and the target using the formula:

$$\frac{d}{\tan(a_i) - \tan(b_i)}$$

wherein d is the predetermined distance in a vertical direction between the laser boresight and the camera boresight, $a_i$ is the angle between the camera boresight and a predetermined laser spot in the vertical direction, and $b_i$ is the angle between the laser beam directed to the predetermined laser spot and the laser boresight in the vertical direction.

In one important implementation, the device further includes a frame grabber connected to or forming part of the camera and an image storage memory connected to the frame grabber and to the processor for storing image frames for retrieval by the processor.

Advantageously, an interchangeable or adjustable lens is disposed in front of the camera for increasing the field of view of the camera.

Further features and advantages of the present invention will be set forth in, or apparent from, the detailed description of preferred embodiments thereof which follows.

BRIEF DESCRIPTION OF THE DRAWINGS

The single FIGURE in the drawings is a highly schematic side elevational view, partially in block diagram form, of a video sensor device in accordance with a preferred embodiment of the invention, shown schematically as being incorporated into a robotic inspection device.

DESCRIPTION OF THE PREFERRED EMBODIMENTS

Referring to the single FIGURE of the drawings, there is shown in a schematic block diagram a video device in accordance with a preferred embodiment of the invention. The video device, which is generally denoted 10, includes a housing 12 which houses or mounts, either directly or indirectly, a single video camera 14 and a laser 16. For example, laser 16 can be separately mounted on top of housing 12 rather than being located therein. Moreover, housing 12 can form part of a robot indicated schematically at 17, or can be the overall housing for such a robot or form part of such a housing. In the particular application discussed above, robot 17 would be movable in and around narrow passages in a space vehicle to enable inspection of space vehicle hardware. The robot 17 itself can be a conventional robot suitable for such a purpose.

Camera 14 has a boresight 14a, and a diverging lens 18 is disposed in alignment with boresight 14a in front of camera 14 so that the camera 14 has a field of view (FOV) 14b which covers a desired area of a target indicated at 20, which, in the abovementioned application, could be part of some space vehicle hardware.

Laser 16 is fixedly supported by housing 12. As indicated in the drawings, laser 16 is spaced a fixed distance "d" from the boresight 14a of camera 14. An optic element 22, which can be a simple prism, a diffractive optic element, i.e., a diffractive grating, or another optical element producing a similar effect, is disposed at the output of laser 16 and serves to split or divide the laser beam produced by laser 16 into a plurality of beams indicated in the drawings and defining angles $b_1$, $b_2$ and $b_3$ with the boresight 16a of laser 16. It will be appreciated that although three beams are shown, and a 3×3 grid of spots has some advantages, a different number of spots can be used.

The multiple beams produced by diffractive optic element 22 are directed at target 20 within the field of view 14b of camera 14. As is also illustrated in the drawings, these beams are reflected from the target 20 and the reflected beams, which define angles $a_1$, $a_2$, $a_3$ with the camera boresight 14a, are received in camera lens 18. The angles $a_1$, $a_2$, $a_3$ (collectively $a_i$) are determined by the location of the laser spots in the field-of-view 14b of camera 14. Because camera 14 has a known angular FOV 14b, the location at which the camera 14 "sees" the laser spot relative to the center of the FOV 14b, measured in degrees, defines $a_i$. For example, if camera 14 has a 40 degree FOV, and a laser spot is located at ½ of the distance to the edge of the FOV from the center of the FOV, the angle $a_i$ is 10 degrees (it being understood a 40 degree FOV means an angle of ±20 degrees relative to the boresight 14a).

The overall device 10 preferably further includes a frame grabber or other conventional image capture circuit 24 connected to camera 14, an image storage memory 26 connected to frame grabber 24 and a processor 28 connected to memory 26 and to laser 16. It will be understood that processor 28 can also be directly connected to frame grabber 24 and that, in general, any suitable conventional system for processing the output of video camera 14 can be employed.

It will be appreciated that camera 14 is used for general inspection of the target 20 as well as detection of the light spots created by the multiple laser beams produced by laser 16 and diffractive optic element 22.

With the arrangement described above, laser 16 acts as a part of the rangefinder system for determining the range "r" between the device 10, or, more accurately, the focal point, and the target 20. The splitting of the laser output beam into multiple beams enables simultaneous measurement to several points (light spots) in the field-of-view 14a of camera 14. When the range to an object (e.g., target 20) within the field-of-view is required, the laser 16 is turned on by processor 28 and an image frame, as grabbed by frame grabber 24, and with the laser or light spots in the frame, is stored in the image memory 26. As another feature, the system can be calibrated to measure range from any point in device 10 (such as in front of lens 18) and the target.

In determining range, the centroid of the spot is located on the stored image stored in memory 26 and the range to the spot is calculated thereon. For the multiple spots provided in the preferred embodiment, the range, r, is calculated using the formula:

$$r = \frac{d}{\tan(a_i) - \tan(b_i)}$$

where "d" is, as indicated above, the distance between the boresight 16a of the laser 16 and the boresight 14a of the camera 14, "$a_i$" is the angle defined between the camera boresight 14a and the point of deflection of the beam from the target 20, displaced in a vertical direction from the point at which boresight intersects the target 20, and "$b_i$" is the angle defined by the outgoing laser beam in the vertical direction with respect to the laser boresight 16a. It is also noted that for multiple spots, the range, r, is also equal to:

$$\frac{d}{\tan(c) - \tan(d)}$$

where the angles "c" and "d" are comparable to the angles "$a_i$" and "$b_i$" but would be measured in the horizontal direction. Computing r in this latter way would allow for some cross-checking of the range data for a particular spot.

Information from the spots adjacent to the center point, i.e., the intersection of the boresight 14a and the target 20 permits calculation of a rough shape for the target surface. However, only the center point range need be calculated. Curved surfaces and corners may be avoided by calculating distances relative to the center point using spatial distortions on the grid.

In an alternative embodiment, two frames would be used, viz., a foreground frame, i.e., the frame with laser spots, and a background frame, i.e., a frame without the laser spots, would be used in order to improve the ability of the system to detect the laser spots. The background frame would be used to subtract out the background of the foreground frame, leaving only the laser spots. This simplifies the image processing.

As indicated above, in the construction of a practical detection device for indoor inspection purposes, it is assumed that lighting conditions are substantially constant. This is reasonable as the inspection process in accordance with this aspect of the invention is to be performed in a controlled setting. This condition enables simplification of the image processing required to extract usable data from the image. The resultant requirements of the system include the requirement that the intensity of the laser exceed the intensity of the target in the image. With these conditions satisfied, an intensity threshold enables the projected pattern of spots to be easily discerned from objects in the environment. Each spot or point to be measured in the image falls within a known region when the target is in the specified range.

In a preferred embodiment, performing conventional edge detection in the regions of interest is used to reveal the location of the projected pattern, and allows the target position to be known. If the edge detection performed fails to indicate a location within the region of interest, the measurement result is returned as off-scale.

The relationship between the target distance and point of interest in the image is inherently nonlinear. This nonlinearity is compounded by the spherical aberrations introduced by the lens of the video camera 14 and/or additional lens 18. While it is possible to flatten the image, thereby allowing the coordinates in the frame to correspond to real world measurements, this is a costly approach in terms of processing time and power. A simplified approach would be to create a linear approximation for the sensor output so as to permit rudimentary calculations to correlate the sensor output to the approximate target distance. However, this approach, while yielding a reasonable approximation of target distance, introduces further error into the system and is unacceptable for navigating a confined space.

In a preferred embodiment, an approach is taken in implementing the system of the invention that accounts for the non-linear relationship referred to above by using a reasonable model of the data that would provide an acceptable error across the range. In this approach, a set of precision, linear stages are used to provide reference measurements, and the coordinates of the point of interest are correlated to the actual measurements. A curve is then fit to the data, and the resultant mean-squared error is then evaluated to determine if the model is of appropriate accuracy. In actual testing, the sensor output allowed for single pixel measurements, and resulted in the requirement that the model never vary from the actual measurement by a half of a pixel in either direction. Experimentation has shown that a sixth order polynominal can be consistently fitted to the data with the desired accuracy. Testing over many calibrations has shown that the error produced is cyclical, and can be attributed to the discrete nature of the image. As the target distance approaches a value accounted for by one of one of the discrete points associated with a pixel value in the image, the error approaches zero. As the target distances moves away from this zero point, the error increases until the midpoint is reached between the two adjacent pixel values. At this point, the error begins to decrease and approach zero again. In practice, the reference in the image is made to traverse as much of the light of the image as possible. This lessens, but does not eliminate, the effect of the error on the outputted measurements.

In a specific, non-limiting implementation, code used was written in the more portable form of C language and a TMS3206416 digital signal processor (DSP) made by Texas Instruments was used. This processor generally corresponds to processor 28 of the drawings. Computers are common for such platforms. The DSP used provides a frame grabber (corresponding to frame grabber 24). The output of the frame grabber is made available to the DSP in the UYVY4:2:2 format. The first step in processing a frame of data is to strip the image of the chrominance planes. A black and white camera was used as camera 14.

As indicated above, in the instances that good data is found in a region of interest, the fitted polynominal is used to calculate the target distance in that region. The Newton-Raphson iterative method was employed to determine the rate of the polynominal offset by the location of the point of interest within the frame. This method is ideally suited for this case in that the fitted polynominal is known to behave well in the neighborhood of the sensor range. Further, the Newton-Raphson method provided the desired result with a minimum of computation making this method ideal for implementation on a variety of low-end processors.

Also addressed in the implementation discussed above was the orientation of the target in three-dimensional space. In this implementation, the projected pattern was extended to allow multiple points or spots to be measured in the vertical direction of the frame. This allowed the system to distinguish objects that formed varying angles with the surface of travel as well as its horizontal orientation to the object. The horizontal relation to the target was determined by measuring multiple points across the width of the image. Knowing (i) the distance to these points (based on the range finding feature of the system), and (ii) the horizontal separation in the image, allows the angle of the camera in relation to the target to be determined on a single axis. This approach can be extended to include the ability to measure relative angles on the vertical axis.

Additional points are introduced into the projected pattern to provide the extended reference. A calibration routine is required to account for this additional information. The cost of calculating the additional measurements can be prohibitive depending on the size requirements of the final device and the processor used. In the case of the particular DSP mentioned above, the additional calculations had minimal impact on the performance of the system and the structure of the implementation. In view of this, the ability to measure the relative roll as well as yaw with respect to the target can be a significant yet cost effective addition to the system.

With the implementations discussed above, the resolution of the camera is the limiting factor in determining the precision of the overall vision system. In tests with small format sensors, the resolution was not significantly reduced with sensors having dimensions as small as ¼ inch. These tests also used an analog camera and the implementations were thus bound by the resolution of the NTSC standard of 720×480 pixels. The use of a higher resolution, low frame-rate camera that provides a digital output would not only increase the precision of the system but would also eliminate the need for a frame grabber (e.g., frame grabber 24), thereby enabling the overall system to be made even smaller.

Although the invention has been described above in relation to preferred embodiments thereof, it will be understood by those skilled in the art that variations and modifications can be effected in these preferred embodiments without departing from the scope and spirit of the invention.

What is claimed is:

1. A robotic inspection device comprising a mobile robot and a video sensor device mounted on the robot, said video sensor device comprising:
   a housing;
   a single video camera and an associated lens, supported by the housing and having a field of view for providing images of a target;
   a single fixed laser, supported by the housing a predetermined distance from said single video camera, for, when activated, producing a laser beam;
   a diffractive optic element, supported in front of the fixed laser, for converting the laser beam produced by said laser into a plurality of laser spots on the target being imaged by said camera so that the images of the target produced by the camera within the field of view of the camera include laser spots; and
   a processor connected to the camera for determining the distance between the camera and the target based on at least one image including laser spots produced by the camera and said predetermined, wherein the laser has a boresight and the camera has a boresight and the distance between the camera and the target is determined using the formula:

$$\frac{d}{\tan(a_i) - \tan(b_i)}$$

wherein d is the predetermined distance in a vertical direction between the laser boresight and the camera boresight, $a_i$ is the angle between the camera boresight and a predetermined laser spot in the vertical direction, and $b_i$ is the angle between the laser beam directed to the predetermined laser spot and the laser boresight in the vertical direction; and
   wherein said device further includes a frame grabber connected to or forming part of said camera and an image storage memory connected to said frame grabber and to said processor for storing image frames for retrieval by the processor.

2. A robotic inspection device for inspecting space vehicle hardware, said robotic inspection device comprising a mobile robot adapted for movement within a space vehicle in which the space vehicle hardware is located, said mobile robot including a video sensor device comprising:
   a single video camera and an associated lens, supported by the mobile robot and having a field of view, for providing images of a hardware target;
   a fixed laser, supported by the mobile robot a predetermined distance from said single video camera, for, when activated, producing a laser beam;
   a diffractive optic element, supported in front of the fixed laser, for converting the laser beam produced by said laser into a plurality of laser spots on the target being imaged by said camera so that the images of the target produced by the camera within the field of view of the camera include laser spots; and
   a processor, supported by the mobile robot and connected to the camera, for determining the distance between the camera and the target based on at least one image including laser spots produced by the camera and said predetermined, wherein the laser has a boresight and the camera has a boresight and the processor determines the distance between the camera and the target using the formula:

$$\frac{d}{\tan(a_i) - \tan(b_i)}$$

wherein d is the predetermined distance in a vertical direction between the laser boresight and the camera boresight, $a_i$ is the angle between the camera boresight and a predetermined laser spot in the vertical direction, and $b_i$ is the angle between the laser beam directed to the predetermined laser spot and the laser boresight in the vertical direction; and
   wherein said device further includes a frame grabber connected to or forming part of said camera and an image storage memory connected to said frame grabber and to said processor for storing image frames for retrieval by the processor.

* * * * *